(12) United States Patent
Harada et al.

(10) Patent No.: US 7,330,412 B2
(45) Date of Patent: Feb. 12, 2008

(54) METHOD AND APPARATUS FOR SEARCHING FOR RECORDABLE AREA, AND METHOD AND APPARATUS FOR TESTING RECORDED AREA ARRANGEMENT

(75) Inventors: Akito Harada, Tokyo (JP); Yoshiho Gotoh, Osaka (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 560 days.

(21) Appl. No.: 10/732,059

(22) Filed: Dec. 10, 2003

(65) Prior Publication Data
US 2004/0151100 A1    Aug. 5, 2004

(30) Foreign Application Priority Data
Dec. 13, 2002  (JP) .............................. 2002-362161
Nov. 17, 2003  (JP) .............................. 2003-387262

(51) Int. Cl.
G11B 19/04    (2006.01)
G11B 15/04    (2006.01)
G11B 20/18    (2006.01)

(52) U.S. Cl. ............................ 369/53.24; 369/53.17; 369/124.07

(58) Field of Classification Search ............ 369/53.24, 369/53.17, 124.07
See application file for complete search history.

(56) References Cited

U.S. PATENT DOCUMENTS

| | | | |
|---|---|---|---|
| 4,638,472 A * | 1/1987 | Ogata et al. ............. | 369/53.24 |
| 5,819,290 A | 10/1998 | Fujita et al. | |
| 6,282,365 B1 * | 8/2001 | Gotoh et al. ............... | 386/95 |
| 2001/0015944 A1 | 8/2001 | Takao et al. | |
| 2001/0043805 A1 | 11/2001 | Tokuo et al. | |
| 2002/0159760 A1 | 10/2002 | Akira et al. | |
| 2007/0162707 A1 * | 7/2007 | So et al. ..................... | 711/154 |

FOREIGN PATENT DOCUMENTS

| | | |
|---|---|---|
| EP | 0 300 264 A | 1/1989 |
| EP | 0 833 339 A | 4/1998 |
| EP | 0 971 349 A | 1/2000 |
| JP | 3098237 | 10/2000 |
| JP | 2000-322876 | 11/2000 |

OTHER PUBLICATIONS

European Search Report for corresponding Application No. 03028742.9 dated Apr. 19, 2005.

* cited by examiner

*Primary Examiner*—Wayne Young
*Assistant Examiner*—Parul Gupta
(74) *Attorney, Agent, or Firm*—Renner, Otto, Boisselle & Sklar, LLP

(57) ABSTRACT

A method for searching for at least one recordable area in which real time data can be recorded from at least one empty area included in an information recording medium includes a first step of setting at least one of a starting end and a terminating end of the section so as to match at least one of a starting end and a terminating end of at least one empty area, and determining whether or not the section fulfills an unused area condition regarding the size and the number; and a second step of determining at least one empty area, included in an area on an information recording medium including at least one section fulfilling the unused area condition, as a recordable area in which real time data can be recorded.

23 Claims, 10 Drawing Sheets

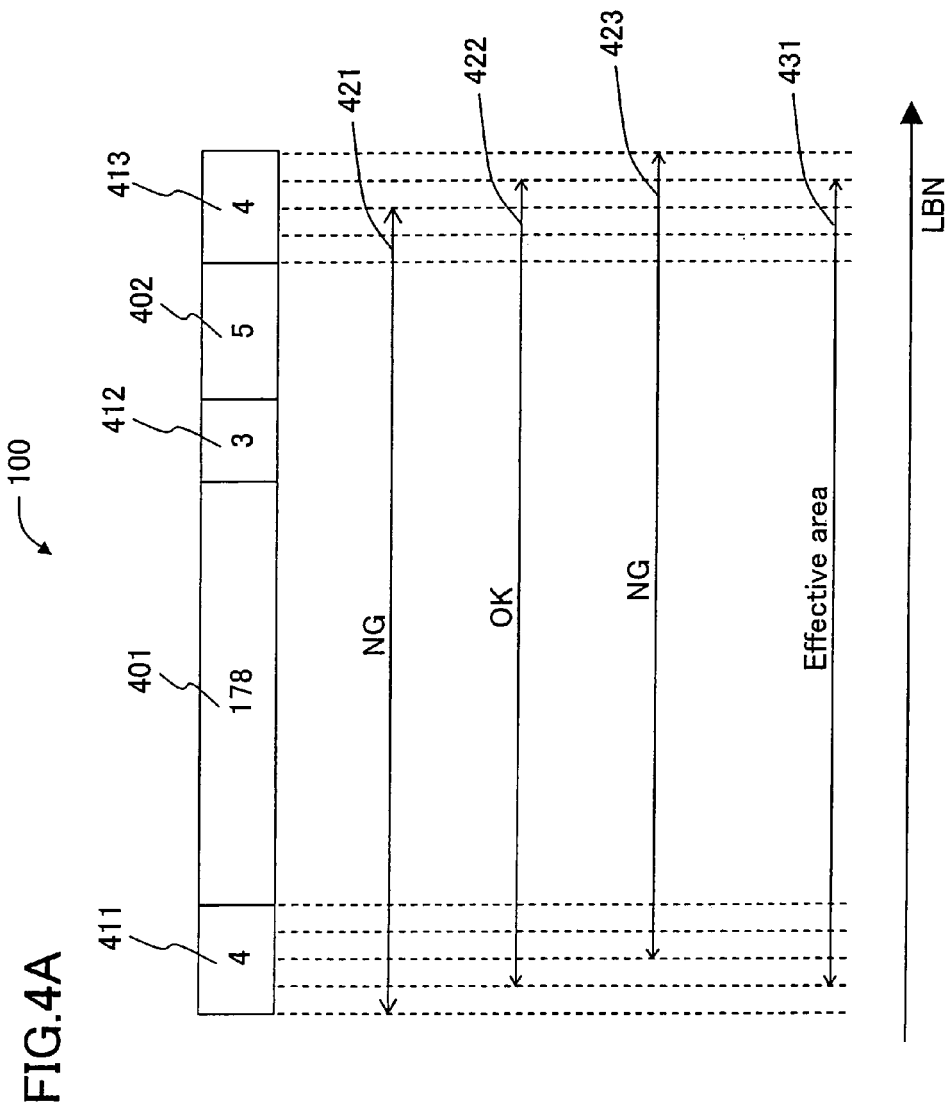

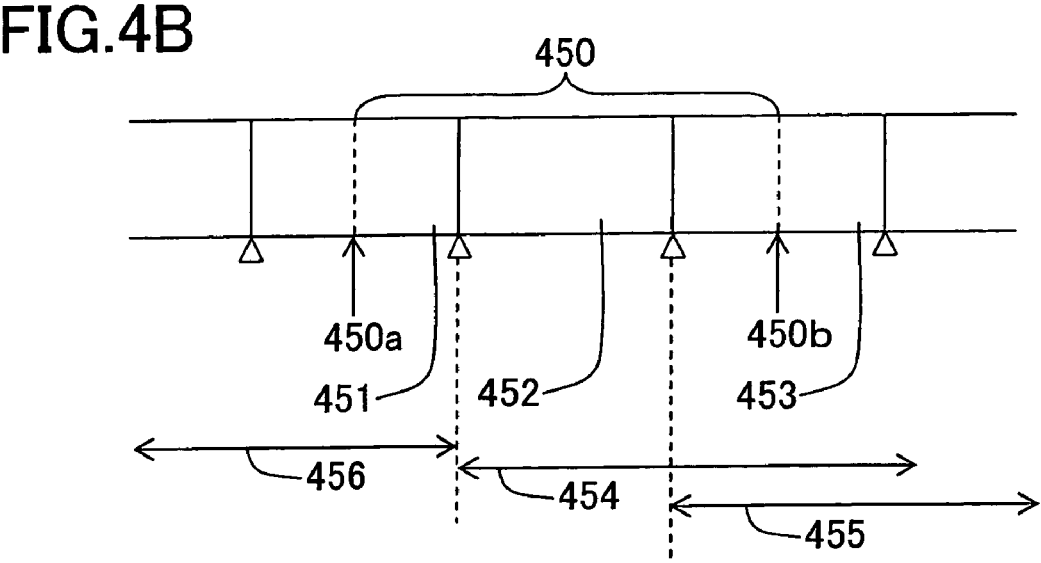

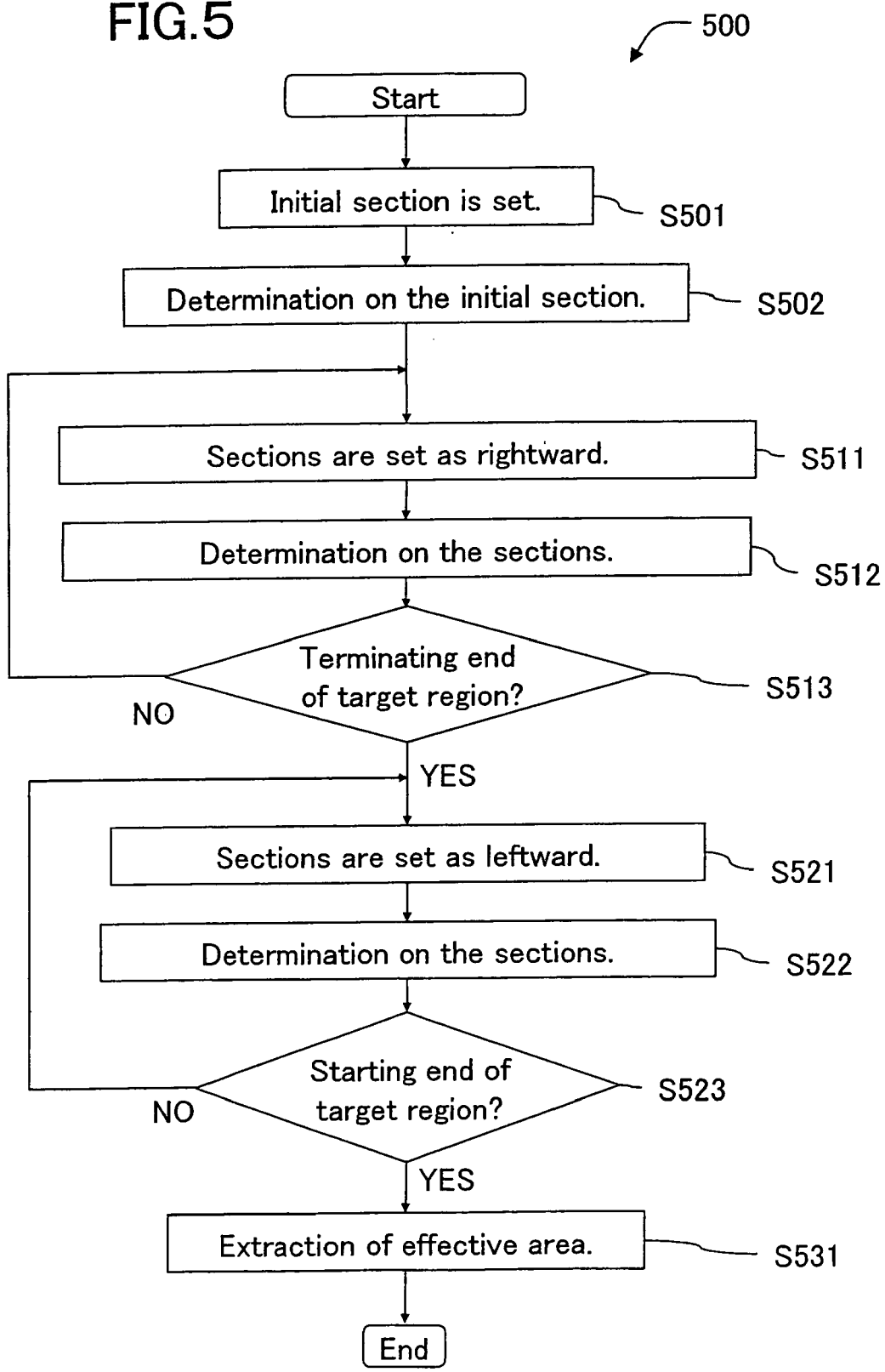

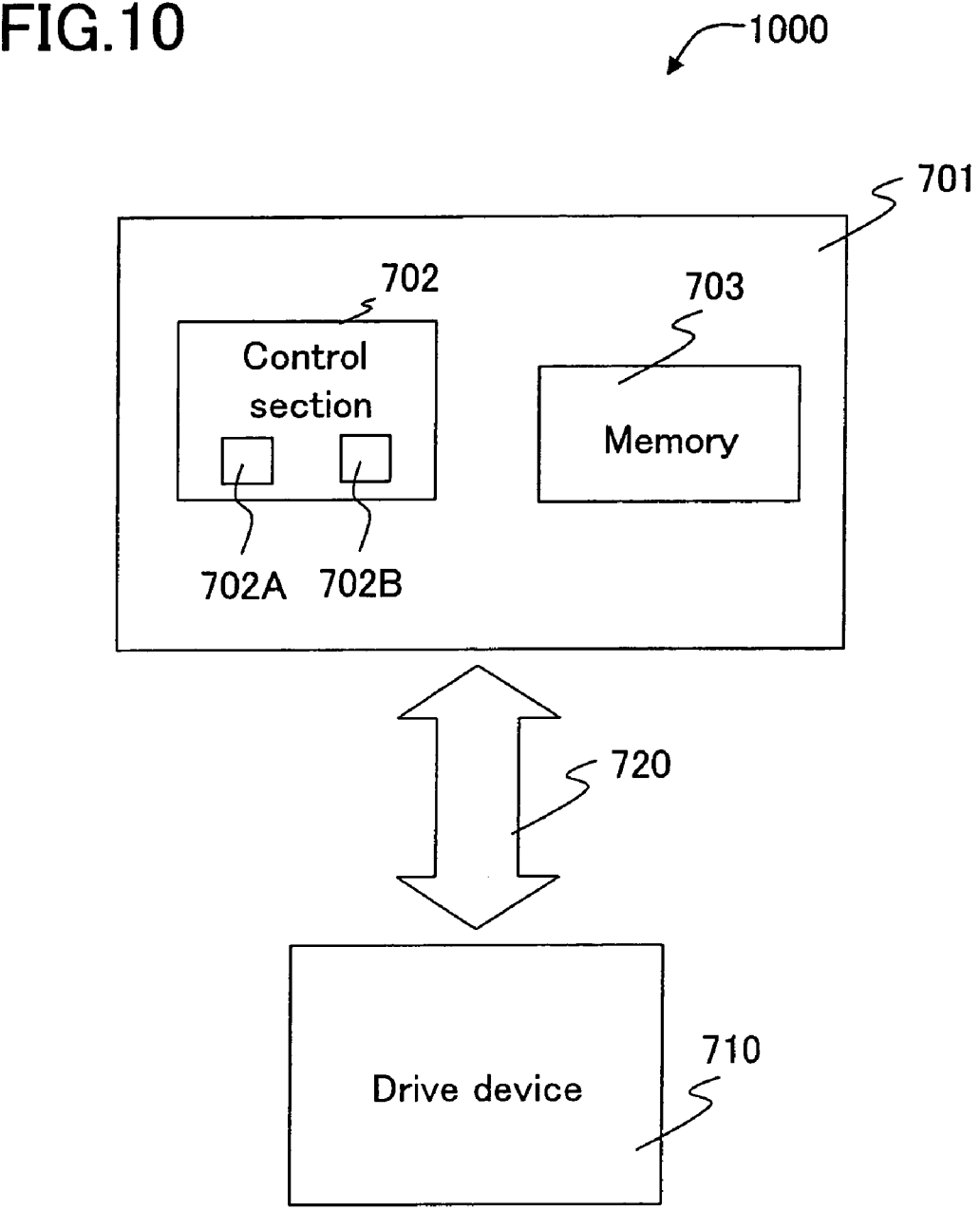

METHOD AND APPARATUS FOR SEARCHING FOR RECORDABLE AREA, AND METHOD AND APPARATUS FOR TESTING RECORDED AREA ARRANGEMENT

BACKGROUND OF THE INVENTION

1. Field of the Invention

The present invention relates to a method and apparatus for searching for a recordable area in which real time data can be recorded from an information recording medium having at least one empty area in a dispersed state, and a method and apparatus for testing an arrangement of recorded areas on the information recording medium in which the real time data has been recorded.

2. Description of the Related Art

An exemplary information recording medium having a sector structure is an optical disc. Owing to the recent increase in recording density and memory capacity of optical discs, the application field thereof is expanding. Optical discs are used, for example, for recording real time data such as video data or audio data.

On an optical disc, defect sectors and areas in which data has been recorded (recorded areas) may exist. For additionally recording data, a skip recording system is proposed, by which recording is performed while skipping such sectors and areas (see, for example, Japanese Patent No. 3098237, FIG. 1).

An optical disc apparatus reproduces video and audio by temporarily accumulating data which is read from an optical disc in a buffer and decoding the accumulated data sequentially. When the data accumulated in the buffer is used up, reproduction of video and audio stops. In order to realize uninterrupted reproduction (seamless reproduction), it is necessary to input data newly read from the optical disc before the data accumulated in the buffer is used up.

With the above-mentioned skip recording system, areas in which real time data has been recorded are located in a dispersed manner. In the case where the areas in which real time data has been recorded discontinuously and dispersedly are concentrated in a specific region, or the length of the interval between dispersed areas in which data has been recorded is excessively long, undesirable phenomena such that reproduction of video is temporarily stopped during real time data reproduction occur. With the above-mentioned skip recording system, it is difficult to realize uninterrupted reproduction of real time data.

SUMMARY OF THE INVENTION

According to one aspect of the invention, a method for searching for at least one recordable area in which real time data can be recorded from at least one empty area included in an information recording medium is provided. An unused area condition representing a size and a number of at least one unused area permitted in a section having a prescribed range of length is predetermined. The at least one unused area is an area on the information recording medium which is not used for recording of the real time data. The size and the number of the unused area represented by the unused area condition are a size and a number which are permitted to realize uninterrupted real time data reproduction when the real time data is recorded in the at least one empty area. The method includes a first step of setting at least one of a starting end and a terminating end of the section so as to match at least one of a starting end and a terminating end of the at least one empty area, and determining whether or not the section fulfills the unused area condition regarding the size and the number; and a second step of determining at least one empty area, included in an area on the information recording medium including at least one section fulfilling the unused area condition, as a recordable area in which real time data can be recorded.

In one embodiment of the invention, the first step includes the step of, when an unused area having a size of 1 ECC block is included in the section, setting at least one ECC block adjacent to the unused area having a size of 1 ECC block as an unused area and determining whether or not the section fulfills the unused area condition regarding the size and the number.

In one embodiment of the invention, the method further includes a third step of setting the starting end of the section so as to match a position between a starting end and a terminating end of at least one of the unused area and determining whether or not the section fulfills the unused area condition regarding the size and the number.

In one embodiment of the invention, the unused area includes a plurality of ECC blocks; and the third step includes the step of setting the starting end of the section so as to match a starting end of at least one of the plurality of ECC blocks and determining whether or not the section fulfills the unused area condition regarding the size and the number.

In one embodiment of the invention, the method further includes a fourth step of setting the terminating end of the section so as to match a position between a starting end and a terminating end of at least one of the unused area and determining whether or not the section fulfills the unused area condition regarding the size and the number.

In one embodiment of the invention, the unused area includes a plurality of ECC blocks; and the fourth step includes the step of setting the terminating end of the section so as to match a terminating end of at least one of the plurality of ECC blocks and determining whether or not the section fulfills the unused area condition regarding the size and the number.

According to another aspect of the invention, a method for testing an arrangement of a plurality of recorded areas, on an information recording medium, in which real time data has been recorded is provided. An unused area condition representing a size and a number of at least one unused area permitted in a section having a prescribed range of length is predetermined. The at least one unused area is an area on the information recording medium in which the real time data has not been recorded. The size and the number of the unused area represented by the unused area condition are a size and a number which are permitted to realize uninterrupted real time data reproduction. The method includes a first step of setting at least one of a starting end and a terminating end of the section so as to match at least one of a starting end and a terminating end of each of the plurality of recorded areas, and determining whether or not the section fulfills the unused area condition regarding the size and the number; and a second step of determining whether or not the plurality of recorded areas are included in an area on the information recording medium including a plurality of continuous sections fulfilling the unused area condition.

In one embodiment of the invention, the first step includes the step of sequentially setting, in one direction, a starting end of a plurality of sections to a starting end of a respective recorded area of the plurality of recorded areas.

In one embodiment of the invention, the first step includes the step of sequentially setting, in one direction, a terminating end of a plurality of sections to a terminating end of a respective recorded area of the plurality of recorded areas.

In one embodiment of the invention, the first step includes the step of, when the terminating end of the section is set so as to match the terminating end of a prescribed recorded area among the plurality of recorded areas and the section does not fulfill the unused area condition regarding the size and the number, setting the starting end of the section so as to match at least one of the starting end and the terminating end of the prescribed recorded area.

In one embodiment of the invention, the method further includes a third step of setting the starting end of the section so as to match a position between a starting end and a terminating end of the unused area and determining whether or not the section fulfills the unused area condition regarding the size and the number.

In one embodiment of the invention, the unused area includes a plurality of ECC blocks; and the third step includes the step of setting the starting end of the section so as to match a starting end of at least one of the plurality of ECC blocks and determining whether or not the section fulfills the unused area condition regarding the size and the number.

In one embodiment of the invention, the method further includes a fourth step of setting the terminating end of the section so as to match a position between a starting end and a terminating end of the unused area and determining whether or not the section fulfills the unused area condition regarding the size and the number.

In one embodiment of the invention, the unused area includes a plurality of ECC blocks; and the fourth step includes the step of setting the terminating end of the section so as to match a terminating end of at least one of the plurality of ECC blocks and determining whether or not the section fulfills the unused area condition regarding the size and the number.

According to still another aspect of the invention, an apparatus for searching for at least one recordable area in which real time data can be recorded from at least one empty area included in an information recording medium is provided. An unused area condition representing a size and a number of at least one unused area permitted in a section having a prescribed range of length is predetermined. The at least one unused area is an area on the information recording medium which is not used for recording of the real time data. The size and the number of the unused area represented by the unused area condition are a size and a number which are permitted to realize uninterrupted real time data reproduction when the real time data is recorded in the at least one empty area. The apparatus includes a first control section for setting at least one of a starting end and a terminating end of the section so as to match at least one of a starting end and a terminating end of the at least one empty area, and determining whether or not the section fulfills the unused area condition regarding the size and the number; and a second control section for determining at least one empty area, included in an area on the information recording medium including at least one section fulfilling the unused area condition, as a recordable area in which real time data can be recorded.

In one embodiment of the invention, when an unused area having a size of 1 ECC block is included in the section, the first control section sets at least one ECC block adjacent to the unused area having a size of 1 ECC block as an unused area and determines whether or not the section fulfills the unused area condition regarding the size and the number.

In one embodiment of the invention, the first control section sets the starting end of the section so as to match a position between a starting end and a terminating end of at least one of the unused area and determines whether or not the section fulfills the unused area condition regarding the size and the number.

In one embodiment of the invention, the first control section sets the terminating end of the section so as to match a position between a starting end and a terminating end of at least one of the unused area and determines whether or not the section fulfills the unused area condition regarding the size and the number.

According to still another aspect of the invention, an apparatus for testing an arrangement of a plurality of recorded areas, on an information recording medium, in which real time data has been recorded is provided. An unused area condition representing a size and a number of at least one unused area permitted in a section having a prescribed range of length is predetermined. The at least one unused area is an area on the information recording medium in which the real time data has not been recorded. The size and the number of the unused area represented by the unused area condition are a size and a number which are permitted to realize uninterrupted real time data reproduction. The apparatus includes a first control section for setting at least one of a starting end and a terminating end of the section so as to match at least one of a starting end and a terminating end of each of the plurality of recorded areas, and determining whether or not the section fulfills the unused area condition regarding the size and the number; and a second control section for determining whether or not the plurality of recorded areas are included in an area on the information recording medium including a plurality of continuous sections fulfilling the unused area condition.

In one embodiment of the invention, the first control section sequentially sets, in one direction, a starting end of a plurality of sections to a starting end of a respective recorded area of the plurality of recorded areas.

In one embodiment of the invention, the first control section sequentially sets, in one direction, a terminating end of a plurality of sections to a terminating end of a respective recorded area of the plurality of recorded areas.

In one embodiment of the invention, the first control section sets the starting end of the section so as to match a position between a starting end and a terminating end of the unused area and determines whether or not the section fulfills the unused area condition regarding the size and the number.

In one embodiment of the invention, the first control section sets the terminating end of the section so as to match a position between a starting end and a terminating end of the unused area and determines whether or not the section fulfills the unused area condition regarding the size and the number.

According to the present invention, recordable areas, which can realize uninterrupted or seamless reproduction of real time data when recording real time data on an information recording medium having empty areas in a dispersed state can be found accurately. Even when defective sectors are locally scattered, or small sizes of files are recorded in a scattered manner, recordable areas for real time data can be found accurately.

According to the present invention, it can be accurately determined whether or not the recorded areas on the information recording medium in which the real time data has been recorded are arranged so as to realize seamless reproduction.

According to the present invention, the number of times that sections are set can be reduced by using certain techniques of setting sections. Thus, the search operation and the determination can be performed accurately and highly efficiently.

Thus, the invention described herein makes possible the advantages of providing a method and apparatus for searching for recordable areas, which can realize uninterrupted or seamless reproduction of real time data when recording real time data on an information recording medium having empty areas in a dispersed state; and a method and apparatus for testing whether the recorded areas on the information recording medium in which the real time data has been recorded are arranged so as to realize seamless reproduction.

These and other advantages of the present invention will become apparent to those skilled in the art upon reading and understanding the following detailed description with reference to the accompanying figures.

BRIEF DESCRIPTION OF THE DRAWINGS

FIG. 4A shows a detailed method for search according to the second example of the present invention;

FIG. 4B shows another detailed method for search according to the second example of the present invention;

FIG. 5 is a flowchart illustrating a method for search according to the second example of the present invention;

FIG. 10 shows an optical disc apparatus according to a fourth example of the present invention.

DESCRIPTION OF THE PREFERRED EMBODIMENTS

Hereinafter, the present invention will be described by way of illustrative examples with reference to the accompanying drawings.

EXAMPLE 1

Figure 1:
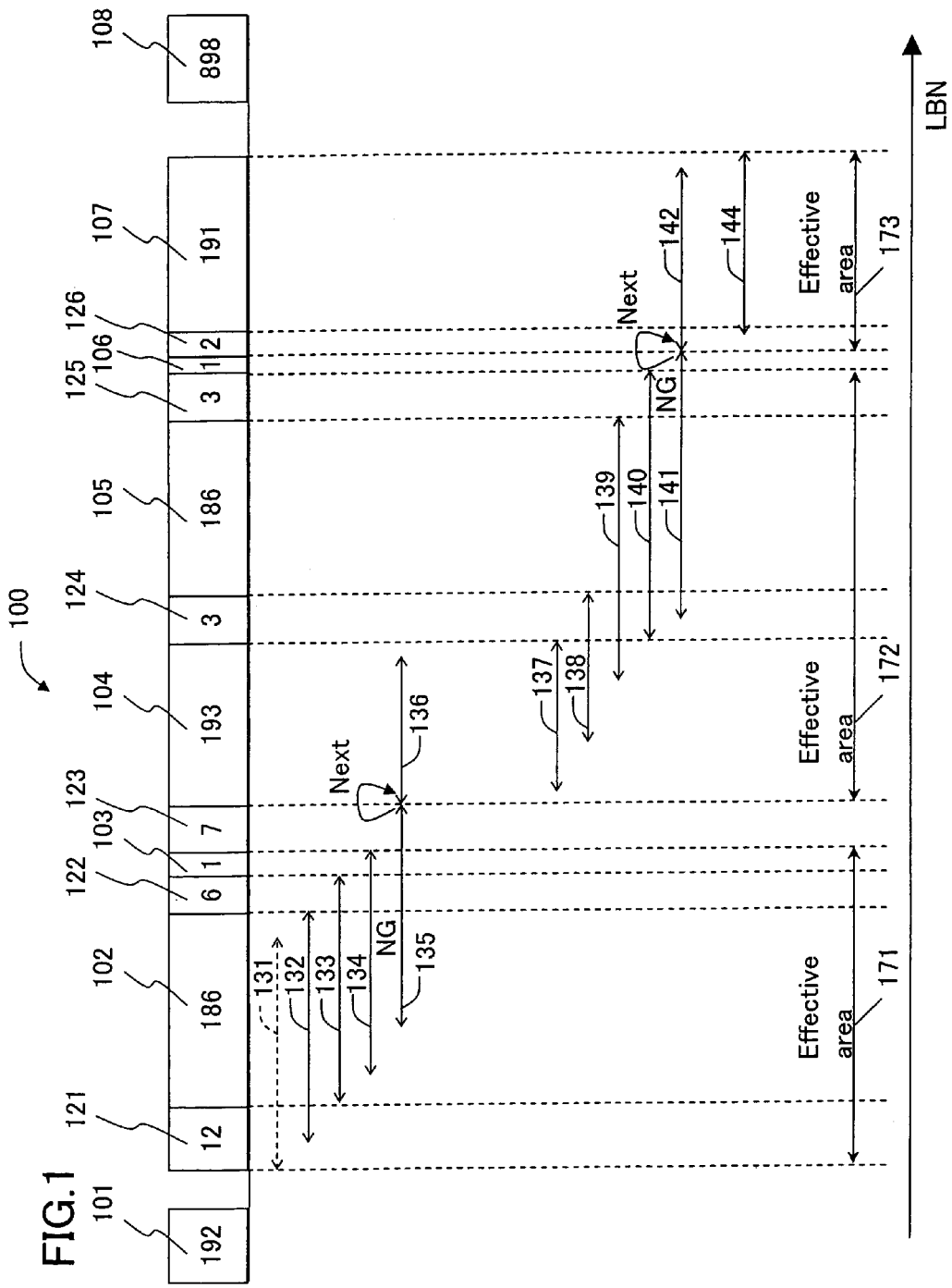
FIG. 1 shows a method for search according to a first example of the present invention.

FIG. 1 schematically shows a method for searching for a recordable area according to a first example of the present invention. The method shown in FIG. 1 is used for searching for a recordable area in which real time data can be recorded, from at least one empty area on an information recording medium 100. The information recording medium 100 is, for example, an optical disc.

FIG. 1 shows a plurality of continuous recording areas along logical block numbers (hereinafter, referred to as the "LBNs"), each of which represents a recording position on the information recording medium 100. The information recording medium 100 includes empty areas 101 through 108 and unused areas 121 through 126. The empty areas 101 through 108 and the unused areas 121 through 126 each have a size based on an ECC block (the unit by which data is read from, or data is written to, the information recording medium 100). An "unused area" is an area which is not be used for recording of real time data for the reason that, for example, the area includes an ECC block including a defect sector or a sector having data already recorded therein. The size of each of the empty areas 101 through 108 and the unused areas 121 through 126 is represented by the number of ECC blocks included in each area. The number is shown in each area in FIG. 1. It is assumed that the areas 101 and 121 are distanced from each other by a sufficient interval (for example, by 192 ECC blocks), and the areas 107 and 108 are also distanced from each other by a sufficient interval (for example, by 192 ECC blocks). Therefore, the areas 101 and 108 do not need to be associated with any of the areas 102 through 107 and 121 through 126 for the search operation. Since the empty areas 101 and 108 each have a size larger than or equal to a certain size, each of the areas 101 and 108 can each have data recorded independently. Therefore, the target of the search operation for areas in which real time data can be recorded (recordable areas) is the areas 102 through 107 and 121 through 126.

Throughout this specification, an end of each area having a smaller LBN is referred to as the "starting end" of the area, and an end of each area having a larger LBN is referred to as the "terminating end" of the area.

Where a section is set in a certain region on an information recording medium, among two ends of the section, an end of the section having a smaller LBN is referred to as the "starting end" of the section, and an end of the section having a larger LBN is referred to as the "terminating end" of the section.

In order to determine whether each area is a recordable area for real time data or not, sections 131 through 144 having a prescribed range of length are used. The length of the sections is, for example, 192 ECC blocks, but is not limited to this.

As a criterion for determining whether each area is a recordable area for real time data or not, an unused area condition is predetermined. The unused area condition represents the size of an unused area and the number of unused areas of each size which is permitted in one section. One example of the unused area condition is shown in Table 1. The size and the number shown in Table 1 are permitted in one section in order to realize seamless reproduction of real time data when the real time data is recorded in at least one empty area. The examples in this specification are based on the unused area condition shown in Table 1.

As shown in Table 1, when, for example, the size of an unused area in a section is 1 ECC block, the number of such unused areas permitted in the section is 1 or 2. When the size of an unused area in a section is 4 ECC blocks, the number of such unused areas permitted in the section is 1, 2, or 3. Hereinafter, the size of each section is represented by the numerical value, without the term "ECC blocks".

TABLE 1

| Size of unused area | Number of unused areas permitted in one section |
|---|---|
| 1 | 1, 2 |
| 2 | 1, 2, 3, 4, 5, 6 |
| 3 | 1, 2, 3, 4 |
| 4 | 1, 2, 3 |
| 5 | 1, 2 |
| 6 | 1, 2 |

TABLE 1-continued

| Size of unused area | Number of unused areas permitted in one section |
|---|---|
| 7 | 1 |
| 8 | 1 |
| 9 | 1 |
| 10 | 1 |
| 11 | 1 |
| 12 | 1 |
| 13 or more | Not permitted |

Before recording data in an empty area in a region which is a target of the search shown in FIG. 1, it is necessary to find which of the empty areas in the region is usable as recordable areas for real time data.

In this specification, an empty area, on the information recording medium 100, in which real time data can be recorded is referred to as the "recordable area"; and an area on the information recording medium 100 including at least one section fulfilling the unused area condition is referred to as an "effective area".

A method for searching for an effective area will be described as follows.

First, the section 131 is set such that the starting end of the section 131 matches the starting end of the region acting as the target (target region), and it is determined whether or not the section 131 fulfills the unused area condition shown in Table 1. The section 131 includes an unused area having a size of 12 (size: 12; number: 1). Thus, the section 131 fulfills the unused area condition.

In this specification, among two ends of a target region, an end having a smaller LBN is referred to as the "starting end" of the target region, and an end having a larger LBN is referred to as the "terminating end" of the target region.

Second, the section 132 is set such that the terminating end of the section 132 matches the starting end of the unused area 122. It is determined whether or not the section 132 fulfills the unused area condition shown in Table 1. The section 132 includes an unused area having a size of 6 (size: 6; number: 1). Thus, the section 132 fulfills the unused area condition.

Similarly, subsequent sections are set such that the terminating end of each section matches the starting end of the respective areas, sequentially. Then, it is determined whether or not each section fulfills the unused area condition shown in Table 1. In the case of the section 135, the size is 6 and the number is 7. The section 135 does not fulfill the unused area condition. Therefore, an effective area 171 terminates at the terminating end of the section 134 which is immediately before the section 135. Thus, a new section 136 is set such that the starting end of the section 136 matches the terminating end of the section 135, and it is determined whether or not the section 136 fulfills the unused area condition.

The section 141 includes unused areas of sizes 2 and 3. Since the section 141 includes a plurality of unused areas having different sizes, the section 141 does not fulfill the unused area condition. In this case, the next section 142 is set such that the starting end of the section 142 matches the terminating end of the section 141. Among the sections which are set in this example, the sections 135 and 141 do not fulfill the unused area condition (such sections will be referred to as "NG sections"). The other sections fulfill the unused area condition (such sections will be referred to as "OK sections"). A region including one or a plurality of continuous OK sections is determined to be an effective area. In FIG. 1, effective areas 171, 172 and 173 are detected. The empty areas included in the effective areas 171, 172 and 173 are recordable areas.

As described above, according to the first example of the present invention, recordable areas for real time data can be searched for within an information recording medium having empty areas in a dispersed manner.

EXAMPLE 2

Figure 2:
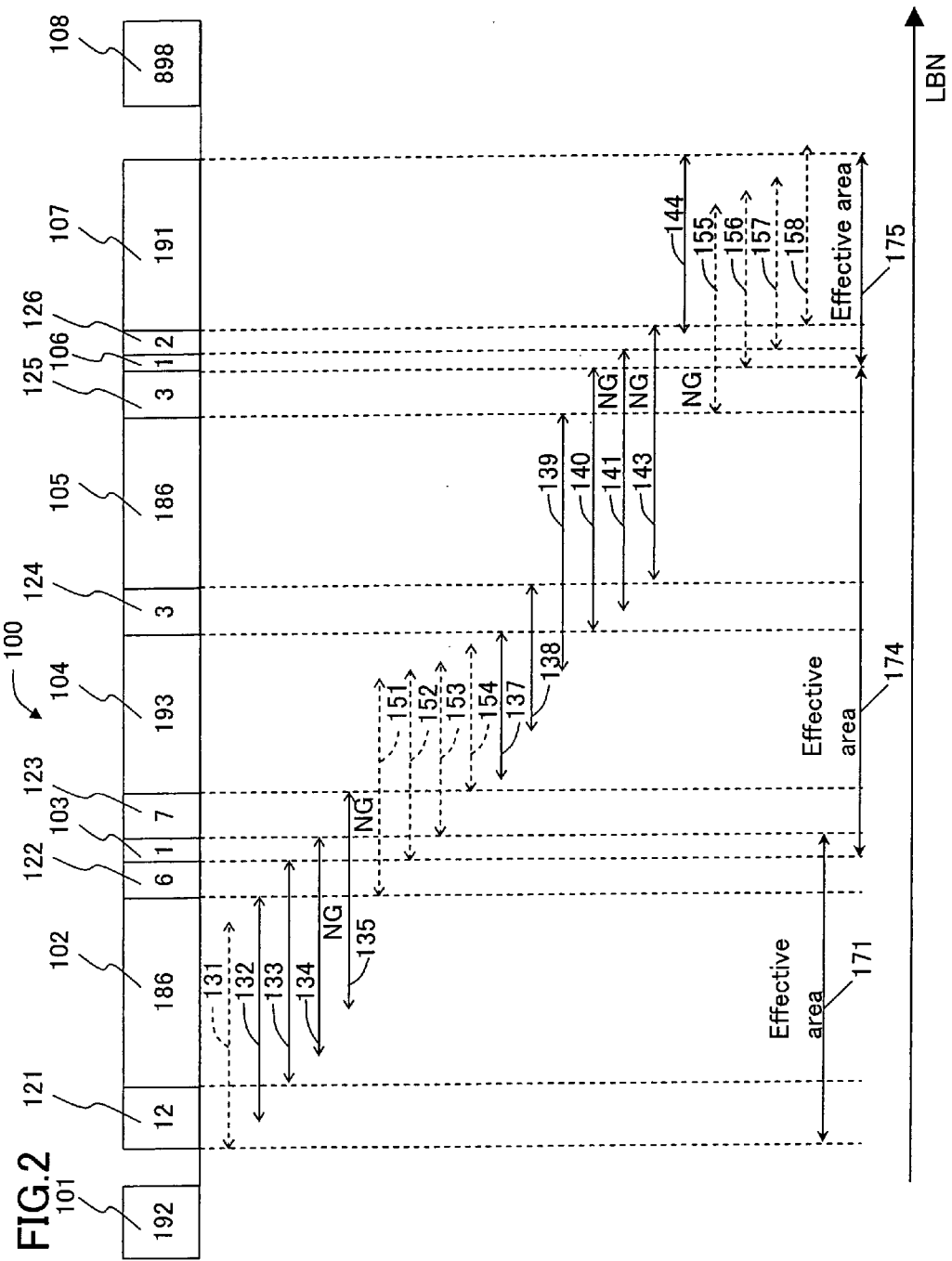
FIG. 2 shows a method for search according to a second example of the present invention.

FIG. 2 schematically shows a method for searching for a recordable area according to a second example of the present invention. FIG. 5 is a flowchart 500 illustrating the method for searching for a recordable area according to the second example of the present invention.

With the method in the first example, the empty area 106 is determined to be an area in which real time data cannot be recorded, and is not included in any effective area. With the method in the second example, the empty area 106 is determined to be a recordable area.

In the second example, sections are set such that at least one of the starting end and the terminating end of a section matches at least one of the starting end and the terminating end of at least one empty area. Then, it is determined whether or not each section fulfills the unused area condition. At least one empty area included in an area, on the information recording medium, which includes at least one section fulfilling the unused area condition is determined to be a recordable area.

With reference to FIGS. 2 and 5, the method according to the second example will be described in more detail.

In step S501, a section 131 (initial section) is set such that the starting end of the section 131 matches the starting end of the target region. In step S502, it is determined whether or not the section 131 fulfills the unused area condition shown in Table 1 regarding the size and the number. The section 131 fulfills the unused area condition.

In step S511, a section 132 is set such that the terminating end of the section 132 matches the starting end of the unused area 122 (i.e., the section 132 is set as rightward with respect to the starting end of the unused area 122).

In this specification, "as rightward" represents a state in which the terminating end of a section matches the starting end or the terminating end of the respective area. "As leftward" represents a state in which the starting end of a section matches the starting end or the terminating end of the respective area. In the figures of the present application, the value of LBN increases toward the right side thereof.

In step S512, it is determined whether or not the section 132 fulfills the unused area condition shown in Table 1 regarding the size and the number. The section 132 fulfills the unused area condition. The state in which the terminating end of the section 132 matches the starting end of the unused area 122 is also described as "the terminating end of the section 132 matches the terminating end of the empty area 102".

In step S513, steps S511 and S512 are repeated until subsequent areas are set as rightward up to the terminating end of the target region. Sections 132 through 144 are set such that the terminating end of each of the sections 132 through 144 matches the starting end or the terminating end of the respective areas (i.e., the sections 132 through 144 are set as rightward with respect to the starting end or the terminating end of the respective area). As a result, it is detected that sections 135, 141 and 143 are NG sections which do not fulfill the unused area condition.

When the sections reach the terminating end of the target region (YES in step S513), the operation advances to step S521. In step S521, additional sections are set as leftward. More specifically, in the example shown in FIG. 2, a section 151 is set such that the starting end of the section 151 matches the starting end of the unused area 122. The sections 131 and 133 have already been checked. In step S522, it is determined whether or not the section 151 fulfills the unused area condition in Table 1. The section 151 includes an unused area of size 6 and an unused area of size 7, and the number of the unused areas is 2. Therefore, the section 151 does not fulfill the unused area condition. The state in which the starting end of the section 151 matches the starting end of the unused area 122 is also described as "the starting end of the section 151 matches the terminating end of the empty area 102".

In the case where sections are set in the direction in which the value of LBN decreases, in step S523, steps S521 and S522 are repeated until subsequent sections are set up to the starting end of the target region. Sections 151 through 158 are set as leftward with respect to the terminating end of the respective areas. As a result, it is detected that the sections 151 and 155 are NG sections.

When the sections reach the starting end of the target region (YES in step S523), the operation advances to step S531. In step S531, an effective area is extracted. More specifically, the NG sections, i.e., the sections 135, 151, 141, 143 and 155 are listed up. In the sections other than these NG sections, namely, areas 171, 174 and 175 are extracted as effective areas each including a region including one or a plurality of continuous OK sections.

In the method according to the first example, the sections are set basically as rightward. In the method according to the second example, the sections are set as rightward and as leftward. The starting end or the terminating end of each section is sequentially moved in one direction (to the right when the sections are set as rightward, and to the left when the sections are set as leftward). In this manner, the sections can be set in all the possible patterns. As a result, the empty area 106 can be detected as a recordable area.

Figure 3:
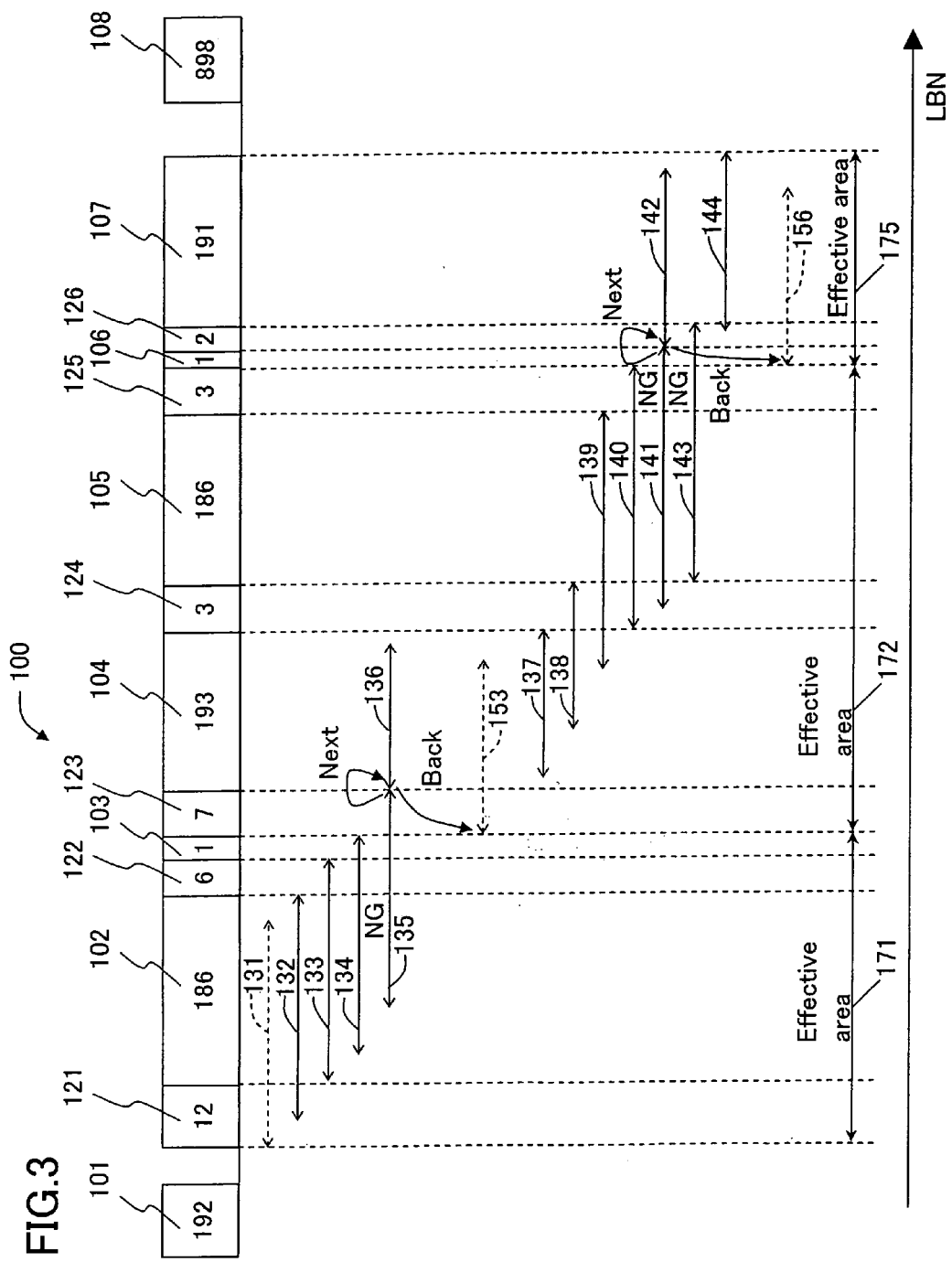
FIG. 3 shows another method for search according to the second example of the present invention.
Figure 6:
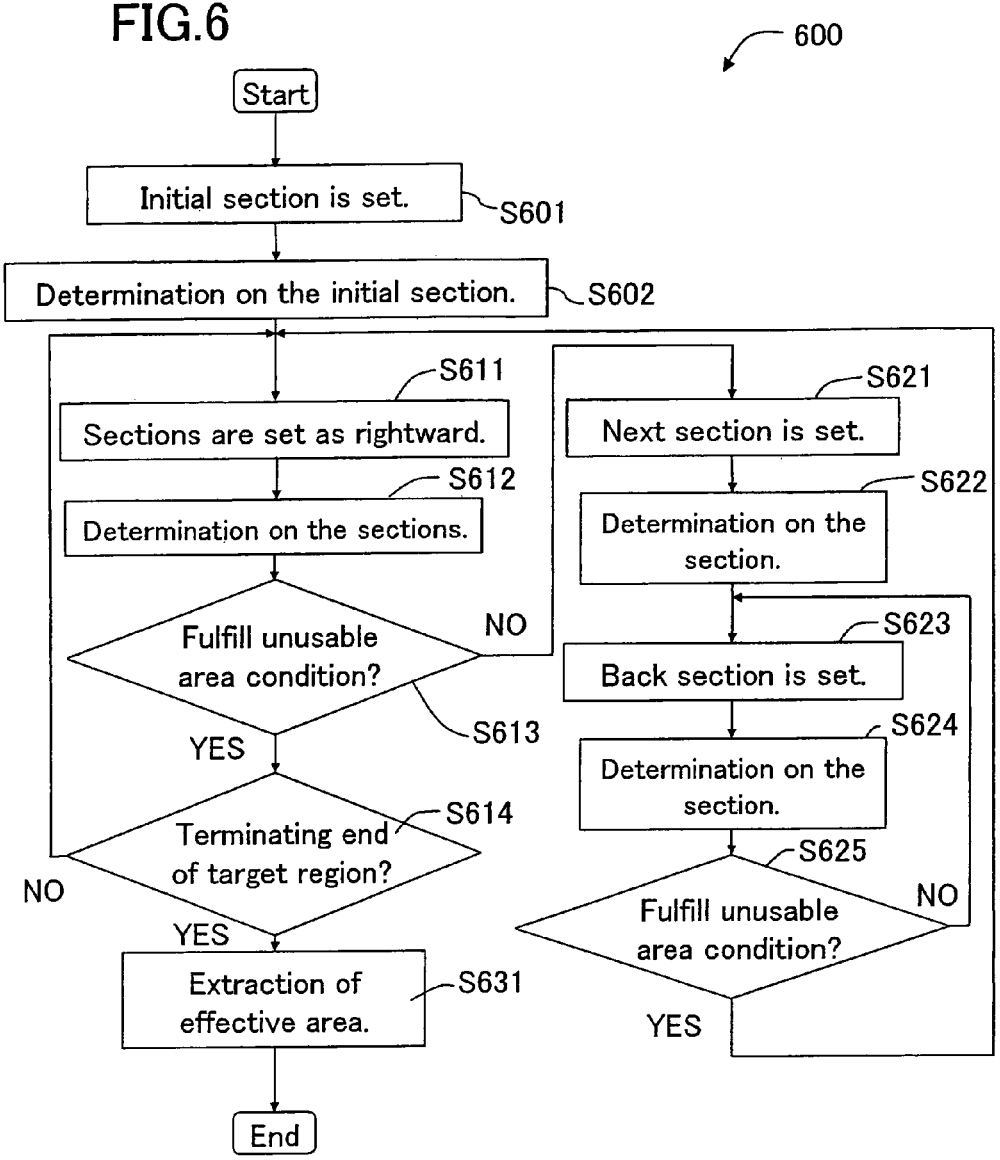
FIG. 6 is a flowchart illustrating another method for search according to the second example of the present invention.

FIG. 3 schematically shows a method for searching for a recordable area according to a modification of the second example of the present invention. FIG. 6 is a flowchart 600 illustrating the method for searching for a recordable area according to the modification of the second example of the present invention. With reference to FIGS. 3 and 6, the method according to the modification of the second example of the present invention will be described. In this modified method, the number of calculation steps can be reduced compared with the method shown in FIGS. 2 and 5.

In step S601, a section 131 (initial section) is set such that the starting end of the section 131 matches the starting end of the target region. In step S602, it is determined whether or not the section 131 fulfills the unused area condition shown in Table 1 regarding the size and the number. The section 131 fulfills the unused area condition.

In step S611, a section 132 is set as rightward such that the terminating end of the section 132 matches the terminating end of the empty area 102. In step S612, the size and the number are checked regarding the section 132. In S613, it is determined whether or not the section 132 fulfills the unused area condition shown in Table 1 regarding the size and the number. The section 132 fulfills the unused area condition.

Until sections reach the terminating end of the target region, the sections are set as rightward, and it is determined whether or not each section fulfills the unused area condition.

A section 135 includes an unused area of size 6 and an unused area of size 7 (number of the unused areas: 2), and thus does not fulfill the unused area condition (NO in step S613). In this case, in step S621, a next section 136 is set such that the starting end of the section 136 matches the terminating end of the section 135. In step S622, it is determined whether or not the section 136 fulfills the unused area condition.

In step S623, the direction in which sections are set is inverted, so that a section 153 (back section) is set as leftward with respect to the starting end of the unused area 123. In step S624, the size and the number are checked regarding the section 153. In step S625, it is determined whether or not the section 153 fulfills the unused area condition. Since the section 153 fulfills the unused area condition (YES in step S625) in this example, the operation returns to step S611. When the section checked is determined to be an NG section (NO in step S625), the operation returns to section S623.

In this manner, when an NG section is detected, the direction in which sections are set is inverted, and a new section is set. Thus, new sections are set one after another. When the section checked is determined to be an OK section (YES in step S625), the operation returns to step S611. When the starting end of a back section reaches the starting end of the target region, the operation also returns to step S611. In the example shown in FIG. 3, the section 153 fulfills the unused area condition.

A section 141 is processed in a similar manner. More specifically, the section 141 is set such that the terminating end of the section 141 matches the terminating end of the empty area 106. Since the section 141 is determined to be an NG section, a next section 142 is set such that the starting end of the section 142 matches the terminating end of the section 141 (i.e., the terminating end of the empty area 106). It is determined whether or not the section 142 fulfills the unused area condition in Table 1. Then, the direction in which sections are set is inverted, so that a section 156 (back section) is set as leftward with respect to the starting end of the empty area 106. The section 156 fulfills the unused area condition. In the case where the section 156 does not fulfill the unused area condition, the starting end of the section 156 is moved to match the terminating end of the empty area 105. Then, it is determined whether or not the section 156 fulfills the unused area condition.

In this manner, when an NG section is detected, the direction in which sections are set is inverted, and a new section is set. Thus, new sections are set one after another.

A section 143 is determined to be an NG section. Although not shown, a next section is set in a similar manner. Then, the direction in which sections are set is inverted, and a back section is set as leftward such that the starting end of the back section matches the starting end of the unused area 126.

As shown in S614, the above steps are repeated until the sections reach the terminating end of the target region.

When the sections reach the terminating end of the target region, in step S631, areas including one or a plurality of continuous OK sections are extracted as effective areas. In FIG. 3, effective areas 171, 172 and 175 are extracted. According to this method, only the sections immediately before (adjacent in the direction toward the starting end of the target region) and immediately after (adjacent in the direction toward the terminating end of the target region) an NG section are set as leftward. Therefore, the number of times that the sections are set can be reduced as compared to the method described above with reference to FIGS. 2 and 5, which improves the calculation efficiency.

Now, with reference to FIG. 4A, another method for finding an effective area with higher accuracy will be described. In the method described above with reference to FIGS. 3 and 6, sections are first set as-rightward; and when a section is determined to be an NG section, the sections are set as rightward thereafter. In order to search for a recordable area more accurately, when a section is determined to be an NG section, subsequent sections are set on an ECC-block-by-ECC-block basis and it is determined whether or not each section fulfills the unused area condition.

As shown in FIG. 4A, the target region includes unused areas 411, 412 and 413 and empty areas 401 and 402.

First, an initial section 421 is set such that the starting end of the section 421 matches the starting end of the target region. Since the section 421 is determined to be an NG section, a section 422 is set such that the section 422 is offset by one ECC block with respect to the section 421. The starting end of the section 422 matches a point between the starting end and the terminating end of an unused area 411. This point is a starting end of a second ECC block in the unused area 411. It is determined whether or not the section 422 fulfills the unused area condition in Table 1. The section 422 includes 3 unused areas each having a size of 3, and thus fulfills the unused area condition. The section 423 is determined to be an NG section, and effective area 431 is extracted.

In the above description, the unused areas 411 and 413 are assumed to have a size of 4 for the sake of simplicity. In the case where the unused areas 411 and 413 are assumed to have a size of, for example, 12, seven more sections are set with the starting end of each section being offset on an ECC-block-by-ECC-block basis, and it is determined whether or not each section fulfills the unused area condition.

Alternatively, the sections maybe set as rightward. In this case, the terminating end of a section is set to match a position between the starting end and the terminating end of an unused area. Then, subsequent sections are set in the same manner with the terminating end of each section being offset on an ECC-block-by-ECC-block basis, and it is determined whether or not each section fulfills the unused area condition. The terminating end of each section may be set to match the terminating end of the respective ECC block.

With this method, when a section is determined to be an NG section, the sections are set to be offset on an ECC-block-by-ECC-block basis. In this manner, an effective area can be extracted with higher accuracy. This method may be used in the methods illustrated in FIGS. 5 and 6.

In the above description, an end of an unused area matches an end of an ECC block, for the sake of simplicity. Since the management unit of recording data is a sector, it is possible that an end of an unused area matches an end of a sector which is not an end of an ECC block.

This is illustrated in FIG. 4B. In FIG. 4B, the symbol "Δ" represents a border of two adjacent ECC blocks. An ECC block 452 is completely included in an unused area 450. An ECC block 453 is partially included in the unused area 450 and partially included in the next area. In other words, the ECC block 453 includes the terminating end 450b of the unused area 450. As in the previous example, a section may be set such that the starting end of the section matches the starting end of the ECC block 452, like a section 454. In addition, a section may be set such that the starting end of the section matches the starting end of the ECC block 453 (i.e., the terminating end of the ECC block 452), like a section 455. In this manner, an effective area can be extracted with higher accuracy.

An ECC block 451 is partially included in the unused area 450 and also partially included in the previous area. In other words, the ECC block 451 includes the starting end 450a of the unused area 450. As in the previous example, a section may be set such that the terminating end of the section matches the terminating end of the ECC block 452, although not shown. In addition, a section may be set such that the terminating end of the section matches the terminating end of the ECC block 451 (i.e., the starting end of the ECC block 452), like a section 456. In this manner, an effective area can be extracted with higher accuracy.

In the case where the starting end or the terminating end of an unused area does not match the border of two adjacent ECC blocks, the ECC block including the starting end or the terminating end of the unused area may be regarded as an unused area for the sake of convenience.

Figure 7A:
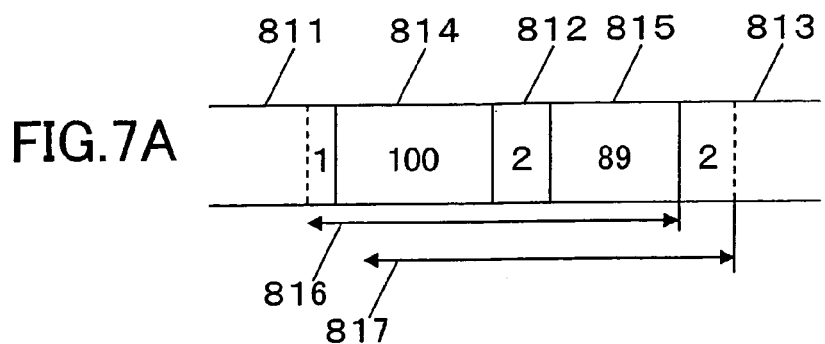
FIGS. 7A and 7B show detailed methods for search according to the second example of the present invention.
Figure 7B:
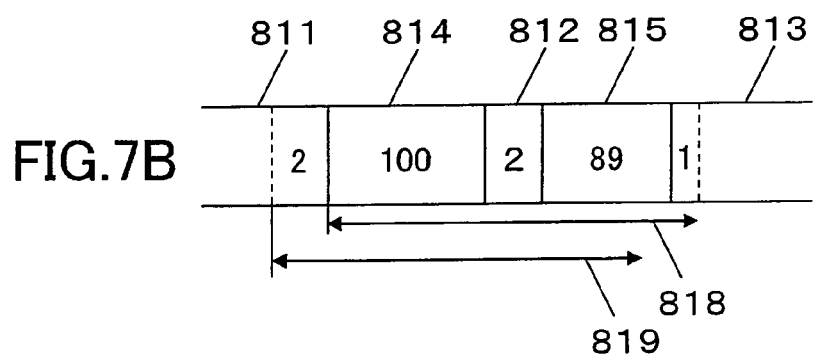

With reference to FIGS. 7A and 7B, examples in which the starting end or the terminating end of a section are set to match a position between the starting end and the terminating end of an unused area will be described.

In FIG. 7A, the target region includes empty areas 814 and 815 and unused areas 811, 812 and 813. A section 816 is set such that the terminating end of the section 816 matches the terminating end of the empty area 815 (i.e., the section 816 is set as rightward to match the terminating end of the empty area 815). Since the section 816 includes an unused area of size 1 (including 1 ECC block) and an unused area of size 2 (including 2 ECC blocks), the section 816 does not fulfill the unused area condition in Table 1.

A section 817 is set such that the terminating end of the section 817 matches the terminating end of the second ECC block in the unused area 813. Since the section 817 includes two unused areas both of size 2 (both including 2 ECC blocks), the section 817 fulfills the unused area condition. Thus, empty areas 814 and 815 can be extracted as recordable areas for real time data.

In FIG. 7B, the method described above with reference to FIG. 7A is applied to the starting end of a section. A section 818 is set such that the starting end of the section 818 matches the starting end of the empty area 814. Since the section 818 includes an unused area of size 2 (including 2 ECC blocks) and an unused area of size 1 (including 1 ECC block), the section 818 does not fulfill the unused area condition in Table 1.

A section 819 is set such that the starting end of the section 819 matches the starting end of the second-to-last ECC block in the unused area 811. Since the section 818 includes two unused areas both of size 2 (both including 2 ECC blocks), the section 818 fulfills the unused area condition. Thus, empty areas 814 and 815 can be extracted as recordable areas for real time data.

By setting the terminating end or the starting end of a section to match a point between the terminating end and the starting end of an unused area, a recordable area can be found with higher accuracy.

Figure 8A:
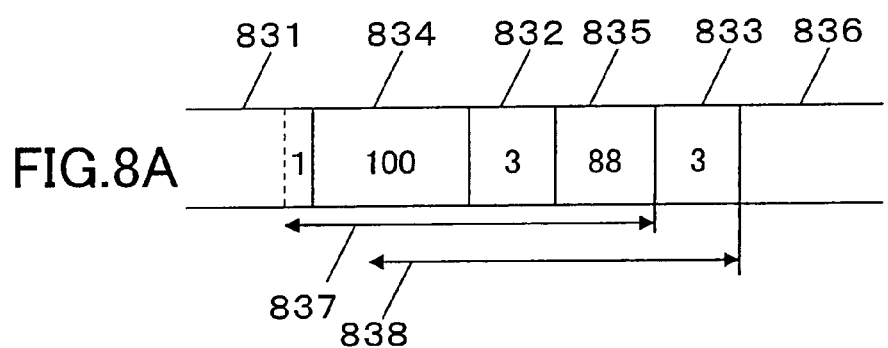
FIGS. 8A and 8B show detailed methods for search according to the second example of the present invention.
Figure 8B:
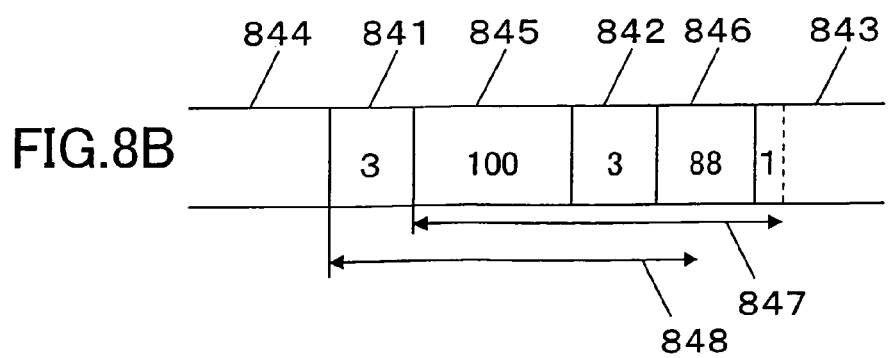

With reference to FIGS. 8A and 8B, examples in which the starting end or the terminating end of a section are set to match the starting end or the terminating end of an unused area will be described.

In FIG. 8A, the target region includes empty areas 834, 835 and 836 and unused areas 831, 832 and 833. A section 837 is set as rightward such that the terminating end of the section 837 matches the terminating end of the empty area 835. Since the section 837 includes an unused area of size 1 (including 1 ECC block) and an unused area of size 3

(including 3 ECC blocks), the section 837 does not fulfill the unused area condition in Table 1.

A section 838 is set such that the terminating end of the section 838 matches the terminating end of the unused area 833. Since the section 838 includes two unused areas both of size 3 (both including 3 ECC blocks), the section 838 fulfills the unused area condition. Thus, empty areas 834 and 835 can be extracted as recordable areas for real time data.

In FIG. 8B, the method described above with reference to FIG. 8A is applied to the starting end of a section. In FIG. 8B, the target region includes empty areas 844, 845 and 846 and unused areas 841, 842 and 843. A section 847 is set as leftward such that the starting end of the section 847 matches the starting end of the empty area 845. Since the section 847 includes an unused area of size 3 (including 3 ECC blocks) and an unused area of size 1 (including 1 ECC block), the section 847 does not fulfill the unused area condition in Table 1.

A section 848 is set such that the starting end of the section 848 matches the starting end of the unused area 841. Since the section 848 includes two unused areas both of size 3 (both including 3 ECC blocks), the section 848 fulfills the unused area condition. Thus, empty areas 845 and 846 can be extracted as recordable areas for real time data.

By setting the terminating end or the starting end of a section to match the terminating end or the starting end of an unused area, a recordable area can be found with higher accuracy.

Figure 9:
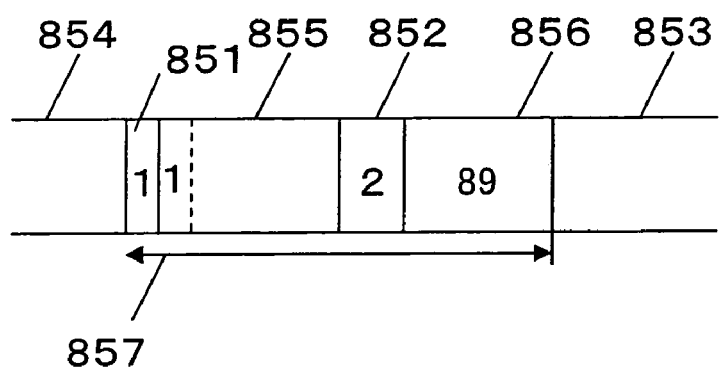
FIG. 9 shows a detailed method for search according to the second example of the present invention.

With reference to FIG. 9, still another method for setting sections and searching for a recordable area will be described. In FIG. 9, the target region includes empty areas 854, 855 and 856 and unused areas 851, 852 and 853. A section 857 is set such that the terminating end of the section 857 matches the terminating end of the empty area 856. Since the section 857 includes two unused areas each of size 1 (each including 1 ECC block) and an unused area of size 2 (including 2 ECC blocks), the section 857 does not fulfill the unused area condition in Table 1.

The section 857 includes the unused area 851 of size 1. In such a case, at least one ECC block adjacent to the unused area 851 having a size of 1 may be set as an unused area. In the example of FIG. 9, the first ECC block in the empty area 855 is set as an unused area. Then, the section 857 includes two unused areas each of size 2, and thus fulfills the unused area condition.

In this manner, in the case where a section does not fulfill the unused area condition due to the size of an unused area included in the section, at least one ECC block adjacent to the unused area may be set as an unused area. Thus, the section is adjusted to fulfill the unused area condition.

EXAMPLE 3

In a third example of the present invention, a method for, after real time data is recorded on the information recording medium 100, testing whether or not the recorded data is continuously reproduceable without interruption will be described. For the method according to the third example, the processing flow described above in the first and second examples are basically adopted.

The method according to the third example is different from the method illustrated in FIG. 2 mainly on the following point.

In the method according to the third example, real time data has been recorded in the empty areas 101 through 108 in FIG. 2. The processing of setting sections and determining the state of the sections is the same as that described above with reference to FIGS. 2 and 5.

Additionally in the method according to the third example, it is determined whether or not a plurality of recorded areas in which the real time data has been recorded are all included in an effective area (an area on the information recording medium 100 including at least one section fulfilling the unused area condition). With reference to FIG. 2, for example, all the recorded areas 102 through 107 are included in continuous effective areas 171, 174 and 175. Therefore, it is determined that the real time data which are recorded in the recorded areas 102 through 107 in a dispersed manner can be continuously reproduced without interruption. In this manner, setting and determination are executed on all the sections. Therefore, it is determined with accuracy whether or not the recorded real time data can be continuously reproduced without interruption.

A method in a modification of the third example will be described.

The modified method is different from the method illustrated in FIG. 3 mainly on the following point.

In the modified method, real time data has been recorded in the empty areas 101 through 108 in FIG. 3. The processing of setting sections and determining the state of the sections is the same as that described above with reference to FIGS. 3 and 6.

Additionally in the modified method, it is determined whether or not a plurality of recorded areas in which the real time data has been recorded are all included in an effective area. With reference to FIG. 3, for example, all the recorded areas 102 through 107 are included in continuous effective areas 171, 174 and 175. Therefore, it is determined that the real time data which are recorded in the recorded areas 102 through 107 in a dispersed manner can be continuously reproduced without interruption. In this manner, it is determined with accuracy whether or not the recorded real time data can be continuously reproduced without interruption.

The methods of search described above with reference to FIGS. 1, 4A, 4B, 7A, 7B, 8A, 8B, and 9 may also be adopted for the method according to the third example.

EXAMPLE 4

FIG. 10 shows an optical disc apparatus 1000 according to a fourth example of the present invention. The optical disc apparatus 1000 includes a search device 701 for searching for an empty area, a drive device 710 for driving an optical disc, and an interface 720 such as, for example, an ATA interface or a USB interface. The search device 701 includes at least a control section 702 and a memory 703. The control section 702 is, for example, a CPU (Central Processing Unit).

The control section 702 performs the method for searching for a recordable area described in the first or second example. The control section 702 includes, for example, a first control section 702A for performing processing of setting sections and determining the state of the sections, and a second control section 702B for performing processing of determining an effective area. In another example, the memory 703 stores a program for having the control section 702 execute the method according to the first or second example. The control section 702 reads the program from the memory 703 and performs the method for searching for a recordable area described in the first or second example. The control section 702 acts as the first control section for executing the processing of setting sections and determining the state of the sections, and also acts as the second control section for executing the processing of determining an effective area based on the program. The search device 701 may be a personal computer. The drive device 710 reads information from, and writes information to, the information recording medium 100.

The method for searching for a recordable area described in the first or second example is executed by the control section 702. Then, the drive device 710 is instructed to record or reproduce prescribed data via the interface 720.

The search device 701 may be a testing device for testing an arrangement of a plurality of recorded areas on an information recording medium in which real time data has been recorded. In this case, the control section 702 executes the testing method described in the third example. For example, the first control section 702A executes processing of setting sections and determining the state of the sections. The second control section 702B executes processing of determining whether or not a plurality of recorded areas in which real time data has been recorded are included in an effective area.

In another example, the memory 703 stores a program for having the control section 702 execute the method according to the third example. The control section 702 reads the program from the memory 703 and performs the method for testing described in the third example. The control section 702 acts as the first control section for executing the processing of setting sections and determining the state of the sections, and also acts as the second control section for executing the processing of determining an effective area based on the program.

The unused area condition usable in the present invention is not limited to those shown in Table 1. Other patterns of unused area conditions are usable, and the conditions may be represented by a formula instead of a table. For example, where the size of each sector is 2 kbyte and the size of each ECC block is 32 kbyte as in DVDs, unused areas having 20 ECC blocks or less in total may be permitted in a section having a length of 200 ECC blocks.

In the above examples, in the case where the sections are set as rightward, the sections are set with respect to the terminating end of empty areas and the terminating end of unused areas alternately. Alternatively, the sections may be set only with respect to the terminating end of the empty areas, not the terminating end of the unused areas. The reason is that when an unused area is included at neither the starting end nor the terminating end of an effective area, it is not necessary to set sections at the terminating end of the unused areas. In this case, the starting end of the initial section is set to match the starting end of an empty area, not the starting end of an unused area.

In the above examples, sections are set in the direction in which the value of LBN increases. The sections may be set in the direction in which the value of LBN decreases. The same effect is provided. For example, the initial section may be set as rightward, and the sections may be set as leftward.

According to the present invention, recordable areas, which can realize uninterrupted or seamless reproduction of real time data when recording real time data on an information recording medium having empty areas in a dispersed state can be found accurately. Even when defective sectors are locally scattered, or small sizes of files are recorded in a scattered manner, recordable areas for real time data can be found accurately.

According to the present invention, it can be accurately determined whether or not the recorded areas on the information recording medium in which the real time data has been recorded are arranged so as to realize seamless reproduction.

According to the present invention, the number of times that sections are set can be reduced by using certain techniques of setting sections. Thus, the search operation and the determination can be performed accurately and highly efficiently.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A method for searching for at least one recordable area in which real time data can be recorded from at least one empty area included in an information recording medium, wherein:
   an unused area is an area on the information recording medium which is not used for recording of the real time data, due to the at least one unused area including at least one ECC block that includes a defect sector or a sector having data already recorded therein;
   the method comprising:
   predetermining an unused area condition, the unused area condition comprising possible sizes of unused areas for a section having a prescribed length, and a corresponding number of unused areas that are permitted in the section for each possible size of unused areas, wherein each possible size and corresponding number of unused areas that will be permitted are predetermined to realize uninterrupted real time data reproduction when the real time data is recorded in the at least one empty area;
   setting at least one of a starting end and a terminating end of the section so as to match at least one of a starting end and a terminating end of the at least one empty area, and determining whether or not the section fulfills the unused area condition by determining whether a number of unused areas within the section is within the number that will be permitted according to the predetermined unused area condition based on the size of the unused area within the section; and
   determining at least one empty area, included in an area on the information recording medium including at least one section fulfilling the unused area condition, as a recordable area in which real time data can be recorded.

2. A method according to claim 1, wherein the step of setting at least one of a starting end and a terminating end includes the step of, when an unused area having a size of 1 ECC block is included in the section, setting at least one ECC block adjacent to the unused area having a size of 1 ECC block as an unused area and determining whether or not the section fulfills the unused area condition regarding the size and the number.

3. A method according to claim 1, further comprising a step of setting the starting end of the section so as to match a position between a starting end and a terminating end of at least one of the unused area and determining whether or not the section fulfills the unused area condition regarding the size and the number.

4. A method according to claim 3, wherein:
   the unused area includes a plurality of ECC blocks; and
   the step of setting the starting end of the section so as to match includes the step of setting the starting end of the section so as to match a starting end of at least one of the plurality of ECC blocks and determining whether or not the section fulfills the unused area condition regarding the size and the number.

5. A method according to claim 1, further comprising a step of setting the terminating end of the section so as to match a position between a starting end and a terminating end of at least one of the unused area and determining whether or not the section fulfills the unused area condition regarding the size and the number.

6. A method according to claim 5, wherein:
the unused area includes a plurality of ECC blocks; and
the step of setting the terminating end of the section so as to match includes the step of setting the terminating end of the section so as to match a terminating end of at least one of the plurality of ECC blocks and determining whether or not the section fulfills the unused area condition regarding the size and the number.

7. A method for testing an arrangement of a plurality of recorded areas, on an information recording medium, in which real time data has been recorded, wherein:
an unused area is an area on the information recording medium in which the real time data has not been recorded, due to the at least one unused area including at least one ECC block that includes a defect sector or a sector having data already recorded therein;
the method comprising:
predetermining an unused area condition, the unused area condition comprising possible sizes of unused areas for a section having a prescribed length, and a corresponding number of unused areas that are permitted in the section for each possible size of unused areas, wherein each possible size and corresponding number of unused areas that will be permitted are predetermined to realize uninterrupted real time data reproduction when the real time data is recorded in the at least one empty area;
setting at least one of a starting end and a terminating end of the section so as to match at least one of a starting end and a terminating end of each of the plurality of recorded areas, and determining whether or not the section fulfills the unused area condition by determining whether a number of unused areas within the section is within the number that will be permitted according to the predetermined unused area condition based on the size of the unused area within the section; and
determining whether or not the plurality of recorded areas are included in an area on the information recording medium including a plurality of continuous sections fulfilling the unused area condition.

8. A method according to claim 7, wherein the step of setting at least one of a starting end and a terminating end includes the step of sequentially setting, in one direction, a starting end of a plurality of sections to a starting end of a respective recorded area of the plurality of recorded areas.

9. A method according to claim 7, wherein the step of setting at least one of a starting end and a terminating end includes the step of sequentially setting, in one direction, a terminating end of a plurality of sections to a terminating end of a respective recorded area of the plurality of recorded areas.

10. A method according to claim 7, wherein the step of setting at least one of a starting end and a terminating end includes the step of, when the terminating end of the section is set so as to match the terminating end of a prescribed recorded area among the plurality of recorded areas and the section does not fulfill the unused area condition regarding the size and the number, setting the starting end of the section so as to match at least one of the starting end and the terminating end of the prescribed recorded area.

11. A method according to claim 7, further comprising a step of setting the starting end of the section so as to match a position between a starting end and a terminating end of the unused area and determining whether or not the section fulfills the unused area condition regarding the size and the number.

12. A method according to claim 11, wherein:
the unused area includes a plurality of ECC blocks; and
the step of setting the starting end of the section so as to match includes the step of setting the starting end of the section so as to match a starting end of at least one of the plurality of ECC blocks and determining whether or not the section fulfills the unused area condition regarding the size and the number.

13. A method according to claim 7, further comprising a step of setting the terminating end of the section so as to match a position between a starting end and a terminating end of the unused area and determining whether or not the section fulfills the unused area condition regarding the size and the number.

14. A method according to claim 13, wherein:
the unused area includes a plurality of ECC blocks; and
the step of setting the terminating end of the section so as to match includes the step of setting the terminating end of the section so as to match a terminating end of at least one of the plurality of ECC blocks and determining whether or not the section fulfills the unused area condition regarding the size and the number.

15. An apparatus for searching for at least one recordable area in which real time data can be recorded from at least one empty area included in an information recording medium, wherein:
an unused area is an area on the information recording medium which is not used for recording of the real time data, due to the at least one unused area including at least one ECC block that includes a defect sector or a sector having data already recorded therein;
the apparatus comprising:
a predetermined unused area condition, the unused area condition comprising possible sizes of unused areas for a section having a prescribed length, and a corresponding number of unused areas that are permitted in the section for each possible size of unused areas, wherein each possible size and corresponding number of unused areas that will be permitted are predetermined to realize uninterrupted real time data reproduction when the real time data is recorded in the at least one empty area;
a first control section for setting at least one of a starting end and a terminating end of the section so as to match at least one of a starting end and a terminating end of the at least one empty area, and determining whether or not the section fulfills the unused area condition by determining whether a number of unused areas within the section is within the number that will be permitted according to the predetermined unused area condition based on the size of the unused area condition; and
a second control section for determining at least one empty area, included in an area on the information recording medium including at least one section fulfilling the unused area condition, as a recordable area in which real time data can be recorded.

16. An apparatus according to claim 15, wherein when an unused area having a size of 1 ECC block is included in the section, the first control section sets at least one ECC block adjacent to the unused area having a size of 1 ECC block as an unused area and determines whether or not the section fulfills the unused area condition regarding the size and the number.

17. An apparatus according to claim 15, wherein the first control section sets the starting end of the section so as to match a position between a starting end and a terminating end of at least one of the unused area and determines whether or not the section fulfills the unused area condition regarding the size and the number.

18. An apparatus according to claim 15, wherein the first control section sets the terminating end of the section so as to match a position between a starting end and a terminating end of at least one of the unused area and determines whether or not the section fulfills the unused area condition regarding the size and the number.

19. An apparatus for testing an arrangement of a plurality of recorded areas, on an information recording medium, in which real time data has been recorded, wherein:

an unused area is an area on the information recording medium in which the real time data has not been recorded, due to the at least one unused area including at least one ECC block that includes a defect sector or a sector having data already recorded therein;

the apparatus comprising:

a predetermined unused area condition, the unused area condition comprising possible sizes of unused areas for a section having a prescribed length, and a corresponding number of unused areas that are permitted in the section for each possible size of unused areas, wherein each possible size and corresponding number of unused areas that will be permitted are predetermined to realize uninterrupted real time data reproduction when the real time data is recorded in the at least one empty area;

a first control section for setting at least one of a starting end and a terminating end of the section so as to match at least one of a starting end and a terminating end of each of the plurality of recorded areas, and determining whether or not the section fulfills the unused area condition by determining whether a number of unused areas within the section is within the number that will be permitted according to the predetermined unused area condition based on the size of the unused area condition; and a second control section for determining whether or not the plurality of recorded areas are included in an area on the information recording medium including a plurality of continuous sections fulfilling the unused area condition.

20. An apparatus according to claim 19, wherein the first control section sequentially sets, in one direction, a starting end of a plurality of sections to a starting end of a respective recorded area of the plurality of recorded areas.

21. An apparatus according to claim 19, wherein the first control section sequentially sets, in one direction, a terminating end of a plurality of sections to a terminating end of a respective recorded area of the plurality of recorded areas.

22. An apparatus according to claim 19, wherein the first control section sets the starting end of the section so as to match a position between a starting end and a terminating end of the unused area and determines whether or not the section fulfills the unused area condition regarding the size and the number.

23. An apparatus according to claim 19, wherein the first control section sets the terminating end of the section so as to match a position between a starting end and a terminating end of the unused area and determines whether or not the section fulfills the unused area condition regarding the size and the number.

* * * * *